Nov. 29, 1927.  
H. N. OTT  
1,650,646  
BINOCULAR MICROSCOPE  
Filed June 1, 1926  2 Sheets-Sheet 1
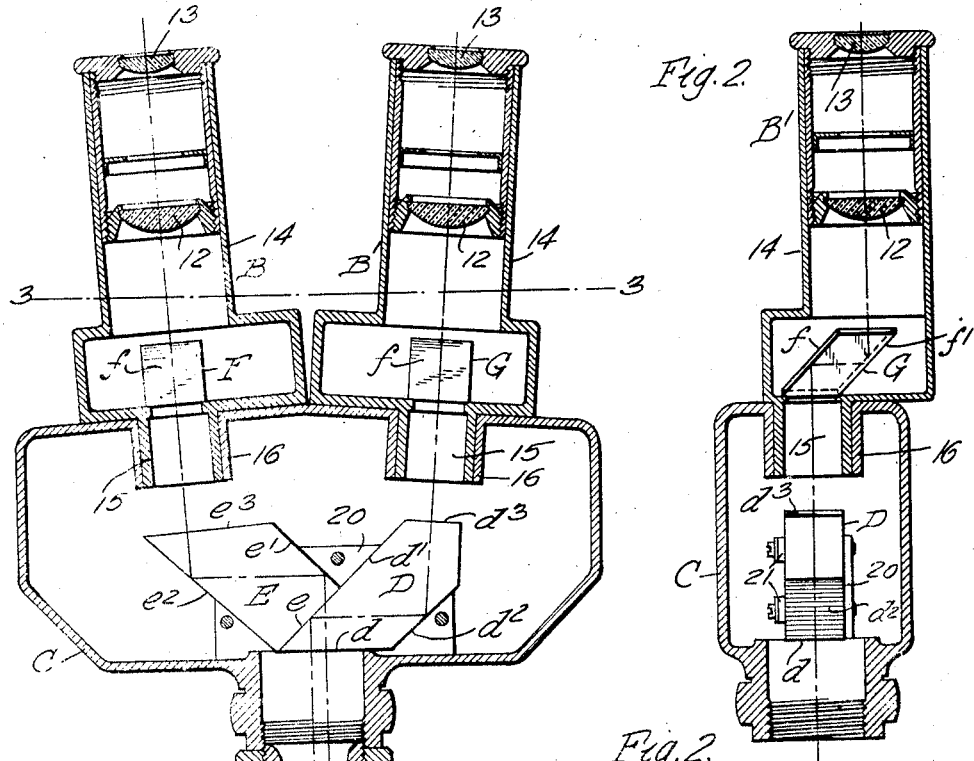
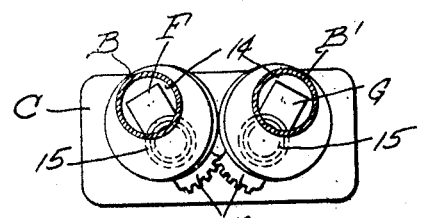
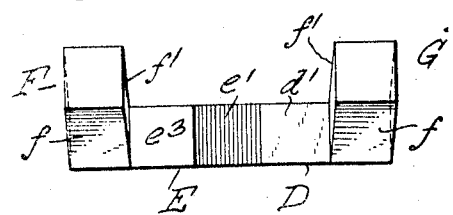
INVENTOR.
Harvey N. Ott.
by Parker & Prochnow
ATTORNEYS.

Nov. 29, 1927.
H. N. OTT
1,650,646
BINOCULAR MICROSCOPE
Filed June 1, 1926    2 Sheets-Sheet 2
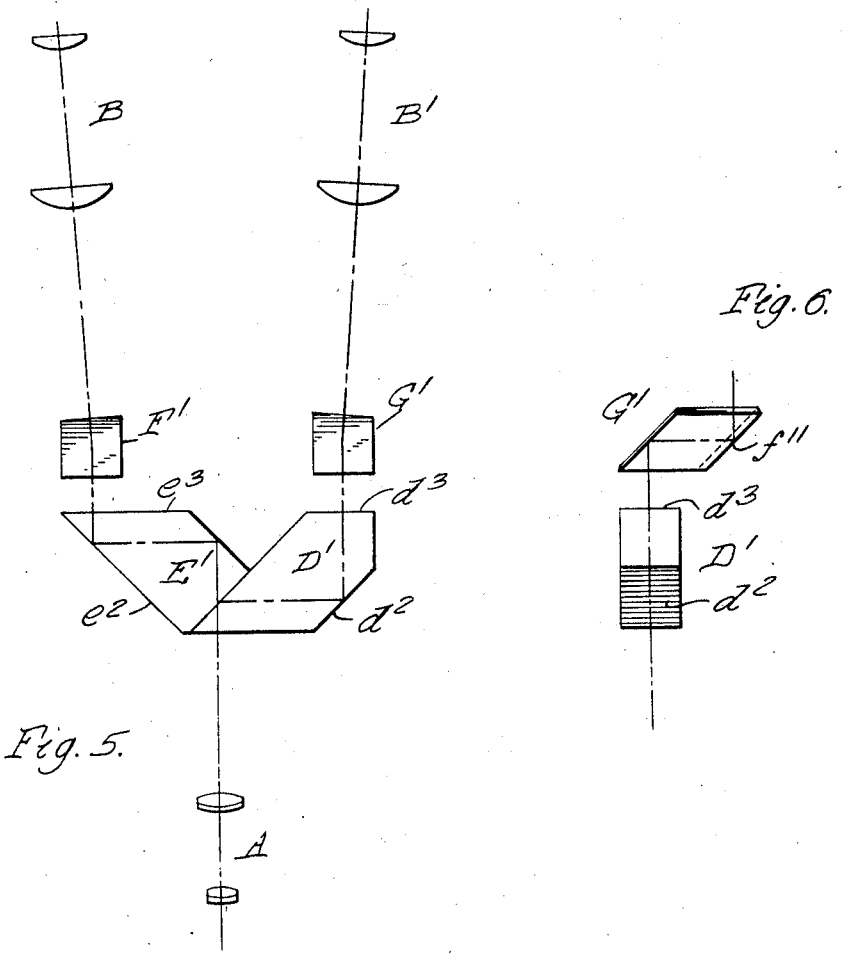
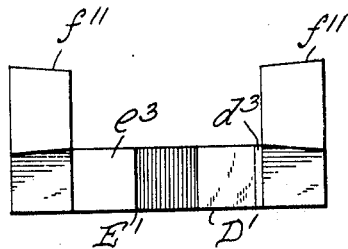
INVENTOR.
Harvey N. Ott.
by Parker & Richmond
ATTORNEYS.

Patented Nov. 29, 1927.

1,650,646

UNITED STATES PATENT OFFICE.

HARVEY N. OTT, OF BUFFALO, NEW YORK, ASSIGNOR TO SPENCER LENS CO., OF BUFFALO, NEW YORK.

BINOCULAR MICROSCOPE.

Application filed June 1, 1926. Serial No. 112,750.

This invention relates to improvements in binocular microscopes, and more particularly to a binocular microscope in which the light rays from the same objective are divided and directed by a reflecting or prism system to the two eyepieces.

In a binocular microscope it is desirable to have the eyepieces converge away from the eyes at substantially the normal angle of convergence of one's eyes for reading or close work, that is about 8°, so that a person using the microscope can remove his gaze from the instrument for reading, making notes, or doing other close eye-work, and return to the microscope without requiring readjustments or refocusing of the eyes with each change of use thereof. The eyepieces should also be capable of adjustment to different pupillary distances.

One object of the invention is to provide a high-powered binocular microscope in which the eyepieces are arranged to converge at an angle adapting the instrument to be used with the maximum eye comfort and are adjustable to suit the pupillary distance of different users, and in which a prism or reflecting system composed of the minimum number of prisms of simple form or reflecting surfaces is employed for directing the light rays from the object being viewed to the two eyepieces.

Another object of the invention is to provide a binocular mon-objective microscope having converging and adjustable eyepieces, in which the prism system for directing the light rays from the objective to the lenses of the two eyepieces is composed of the minimum number of prisms and includes a single prism for each eyepiece, which is adjustable with the eyepiece when the eyepieces are adjusted for different pupillary distances, so as to maintain the light rays in the eyepieces always parallel with the axes of the latter in any adjustment of the eyepieces.

Another object is to improve and simplify binocular microscopes in the other respects hereinafter described and set forth in the claims.

In the accompanying drawings:

Fig. 1 is a longitudinal, vertical section of a mon-objective, binocular microscope embodying the invention.

Fig. 2 is a transverse, longitudinal section thereof showing one of the eyepieces in section and showing the prism system in elevation.

Fig. 3 is a sectional plan view on a reduced scale on line 3—3, Fig. 1.

Fig. 4 is a plan view showing the relation of the several prisms disassociated from the other parts of the instrument.

Fig. 5 is a diagrammatic view showing a slightly modified prism system and the relation of the same to the lenses of the eyepieces and the objective.

Fig. 6 is a side elevation of the prism system shown in Fig. 5.

Fig. 7 is a plan view of the same.

The two embodiments of the invention shown respectively in Figs. 1–4 and 5–7, are similar except for a slight modification in the form and arrangement of the prisms.

Referring first to the construction shown in Figs. 1–4, A represents the objective, B B' the two eyepieces, and C a prism box or housing on which the objective and eyepieces are mounted and in which is enclosed the prism system for dividing the light rays from the objective and directing them to the two eyepieces. The objective and eyepieces are provided with lens systems of usual or any suitable kind. As shown, the objective is provided with lenses 10 and 11, and each eyepiece is provided with lenses 12 and 13. A simple objective is shown consisting of a single tube carrying the lenses 10 and 11, and adapted to be detachably screwed into a threaded nipple extending downwardly from the center of the bottom of the prism box C. It will be understood, however, that objectives of other construction could be employed and that an objective mounting carrying a plurality of different objectives and adapted to be shifted for placing one or another of the objectives in operative position could be used. Each eyepiece preferably comprises, as shown, an upper tubular portion 14 in which the lenses 12 and 13 are mounted, and a communicating tubular, lower end or portion 15 which is offset laterally from the portion 14, so that the axes of the two portions 14 and 15 are out of alinement but parallel with each other, and each eyepiece is rotatably mounted on the prism box C so that it can be swung about the axis of its lower portion 15 for the purpose of adjusting the upper ends of the eyepieces nearer to or further from each other to different pupillary distances. For this purpose, in the construction shown, the tubular lower end of each eyepiece is seated and adapted to turn in a tubular socket 16 extending inwardly from the top of the prism box C. It will be noted that the two eyepieces are positioned so that their optical axes converge toward the objective, preferably at an angle of about 8°, which is substantially the normal angle of convergence of one's eyes for reading or observing objects close at hand.

Preferably the eyepieces are provided with toothed or gear segments 17, see Fig. 3, which mesh with each other so that when adjusting the eyepieces for different pupillary distances the two eyepieces will be caused to swing simultaneously and correspondingly.

The construction thus far described is known in binocular mon-objective microscopes and of itself forms no part of the present invention.

Enclosed in the prism box C is a system of light ray-dividing and reflecting surfaces preferably formed by two prisms D and E. The prism D is provided with lower and upper faces $d$ and $d^3$ and opposite inclined faces $d'$ and $d^2$. The prism D is disposed with its bottom face $d$ crossing and perpendicular to the optical axis of the objective A, and the face $d'$ crosses the optical axis of the objective at an angle of 45° thereto so that the light rays from the objective entering the prism D will be deflected by the face $d'$ transversely through the prism to the face $d^2$ which directs the rays upwardly and out through the top face $d^3$ of the prism, which is perpendicular to the axis of the eyepiece B'. The face $d^2$ is preferably disposed at an angle of 137° to the bottom face $d$ of the prism so that the light rays reflected upwardly from this face will diverge at an angle from the optical axis of the objective and parallel or coincident with the optical axis of the eyepiece B'. The other prism E has lower and upper end faces $e$ and $e^3$ and opposite inclined faces $e'$ and $e^2$. The lower face is held flat against and in close contact with the inclined face $d'$ of the prism D, the face $e'$ inclines at an angle of 45° to the axis of the objective, and the faces $e^2$ and $e^3$ are disposed at angles corresponding but opposite respectively to the angles of the corresponding faces $d^2$ and $d^3$ of the prism D. A light silver or reflecting film is provided on one of the contacting faces of the two prisms, preferably on the face $d'$ of the prism D, for dividing the light rays from the objective, whereby a portion of the rays is deflected laterally through the prism D and the remaining rays pass through the reflecting film and are deflected laterally to the opposite side by the inclined face $e'$ of the prism E. This prism system thus serves to divide the light rays from the objective and deliver the rays from the prisms D and E into the two eyepieces parallel with the converging axes of the eyepieces, as indicated by the dot-and-dash lines in Fig. 1.

The prisms D and E may be mounted and secured in the prism box by any usual or suitable means. As shown, the contacting faces $d'$ and $e$ of the two prisms are cemented together and the two prisms are clamped against an upright stationary plate or member 20 in the prism box by cross bars or plates 21, Fig. 2, which bear against the opposite sides of the two prisms and are secured by screws to the stationary plate or member 20.

Arranged in or mounted on the lower portions of the eyepieces B B' and secured so as to be rigid with and partake in the swinging adjustments of the eyepieces are two prisms F and G one for each eyepiece. These prisms are alike and each prism is provided with upper and lower faces which cross and are perpendicular to the axis of the eyepiece in which the prism is located, and the prism is provided with opposite inclined faces $f$ and $f'$ of such angularity that the light rays entering each prism F, G from the lower prism E or D are deflected, first laterally from the axis of the lower, tubular portion 15 of the related eyepiece and then upwardly parallel with the axis of the upper tubular portion 14 of the eyepiece. These prisms F and G serve to offset or deflect the rays from the lower to the upper tubular portions of the eyepieces, and since each prism swings with the eyepiece on which it is secured when the eyepiece is adjusted, the light rays entering this prism will always emerge from the prism parallel with the axis of the upper portion of the eyepiece, irrespective of the different swinging or rotary adjustments of the eyepiece for pupillary distance.

In the modified prism system shown in Figs. 5–7, the prisms D' and E' are of similar form and arrangement to the prisms D and E above described, except that the faces $d^2$ and $e^2$ of these prisms are disposed at an angle of 45° to the axis of the objective, and the upper end faces $d^3$ and $e^3$ are perpendicular to the axis of the objective so that the light rays emerge vertically upward from the prisms D' and E' parallel with the axis of the objective. The upper prisms F' and G', like the prisms F and G in the first construction, are secured to the eyepieces B B' so as to partake in the swinging adjustments of the latter, and these prisms are similar in form and disposition to the prisms F and G except that the bottom faces of the prisms F' and G' are parallel with the top faces $d^3$ and $e^3$ of the prisms E' and D', and the outer, inclined faces $f''$ of these prisms, in addition to being inclined to the vertical as shown in Fig. 6, are also inclined or oblique to the parallel vertical side faces of these prisms, as shown in Fig. 7, so that the rays are deflected upwardly by the faces f'' at an angle to the vertical, that is parallel with the converging axes of the eyepieces. The top faces of the prisms F' G' are inclined so as to be perpendicular to the axis of the eyepieces B B' to prevent deflection of the rays passing therethrough.

In each of the two described arrangements there are two prisms or four reflecting surfaces for dividing and directing the rays from the objective to the two eyepieces, and a single prism or two reflecting surfaces secured to each of the eyepieces which partake in the swinging adjustments of the eyepiece and serve to offset or deflect the rays from the axis of the lower tubular portion of the eyepiece to the offset or eccentric upper portion thereof. Thus, while the light rays are delivered from the single objective to the two converging and adjustable eyepieces parallel with the axes of the latter irrespective of the pupillary adjustments of the eyepieces, nevertheless the lengths of the paths of the light rays, the number of the reflections of the light rays and the absorption of light are reduced to the minimum, and the microscope is adapted for high power work.

I claim as my invention:—

1. In a microscope, the combination of an objective, converging eyepieces mounted to swing about axes parallel with said converging axes of the eyepieces for adjusting the pupillary distance between the eyepieces, a system of reflecting surfaces for dividing the light rays from said objective and directing a portion thereof toward each eyepiece, and two reflecting surfaces for each eyepiece which partake in the pupillary adjustments of said eyepiece and receive light rays from said reflecting system and deliver the same to the lenses of the eyepiece parallel with the optical axis of the latter in any adjustment of the eyepiece.

2. In a microscope, the combination of an objective, converging eyepieces mounted to swing about axes parallel with said converging axes of the eyepieces for adjusting the pupillary distance between the eyepieces, a prism system for dividing the light rays from said objective and directing a portion thereof toward each eyepiece, and a single prism for each eyepiece which partakes in the pupillary adjustments of said eyepiece and receives the light rays from said prism system and delivers the same to the lenses of the eyepiece parallel with the optical axis of the latter in any adjustment of the eyepiece.

3. In a microscope, the combination of an objective, converging eyepieces mounted to swing about axes parallel with said converging axes of the eyepieces for adjusting the pupillary distance between the eyepieces, a system of reflecting surfaces for dividing the light rays from said objective and directing them in lines parallel with the converging axes of the eyepieces, and two reflecting surfaces for each eyepiece which partake in the pupillary adjustments of said eyepieces and receive light rays from the reflecting system and deliver the same to the lenses of the eyepiece parallel with the optical axis of the latter in any adjustment of the eyepiece.

4. In a microscope, the combination of an objective, converging eyepieces mounted to swing about axes parallel with said converging axes of the eyepieces for adjusting the pupillary distance between the eyepieces, a prism system for dividing the light rays from said objective and directing them in lines parallel with the converging axes of the eyepieces, and a single prism for each eyepiece which partakes in the pupillary adjustments of said eyepiece and receives the light rays from said prism system and delivers the same to the lenses of the eyepiece parallel with the optical axis of the latter in any adjustment of the eyepiece.

5. In a microscope, the combination of an objective, converging eyepieces mounted to swing about axes parallel with said converging axes of the eyepieces for adjusting the pupillary distance between the eyepieces, a prism system for dividing the light rays from said objective and having surfaces inclined at substantially 47° to the vertical for directing the light rays toward the eyepieces, and a single prism for each eyepiece which partakes in the pupillary adjustments of said eyepiece and receives the light rays from said prism system and delivers the same to the lenses of the eyepiece parallel with the optical axis of the latter in any adjustment of the eyepiece.

6. In a microscope, the combination of converging eyepieces mounted to swing about axes parallel with said converging axes of the eyepieces for adjusting the pupillary distance between the eyepieces, a prism system for directing light rays from the object being viewed toward said eyepieces, and a single prism for each eyepiece which partakes in the pupillary adjustments of said eyepiece and receives the light rays from said prism system and delivers the same to the lenses of the eyepiece parallel with the optical axis of the latter in any adjustment of the eyepiece.

7. In a binocular microscope, the combination of an objective, converging eyepieces having parallel offset upper and lower tubular portions and adjustably mounted to swing about the axes of said lower portions, prisms arranged to divide the light rays from the object and direct them toward said eyepieces, and a single prism secured to each eyepiece and partaking in the swinging adjustments thereof and arranged to receive the light rays from said first mentioned prisms and deliver the same to the upper portion of the eyepiece parallel with the axis thereof.

8. In a binocular microscope, the combination of an objective, two converging eyepieces each comprising tubular upper and lower portions which are offset relatively to each other, said eyepieces being adjustably mounted to swing about the axes of their lower portions, prisms formed and arranged to divide the light rays from said objective and deliver the same into the lower portions of said eyepieces parallel with the converging axes thereof, and a single prism secured in each eyepiece and partaking in the swinging adjustments thereof and formed to deliver the light rays received through the lower portion of the eyepiece into the upper portion of the eyepiece parallel with the axis thereof.

HARVEY N. OTT.